Oct. 4, 1927.
L. H. CHURCH
1,644,308
CABLE CONNECTER
Filed April 23, 1926      2 Sheets-Sheet 1
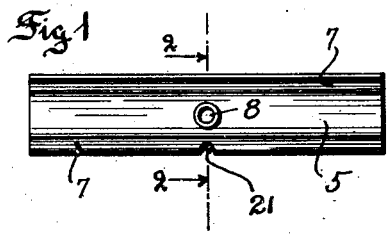
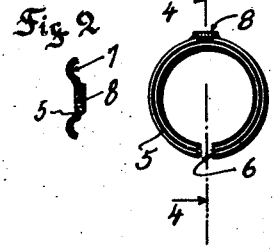
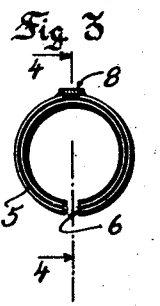
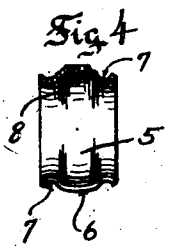
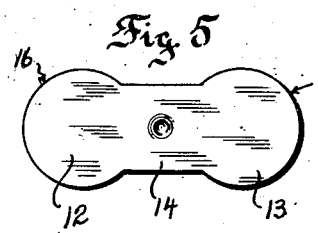
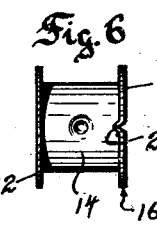
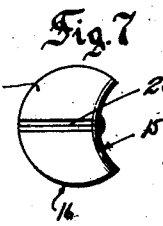
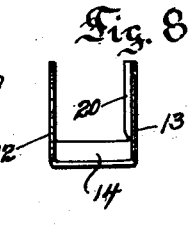
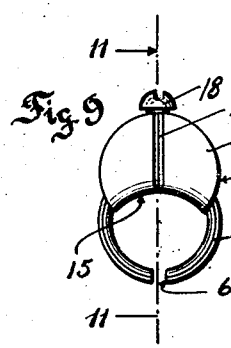
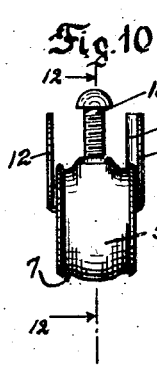
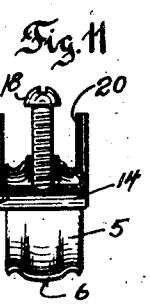
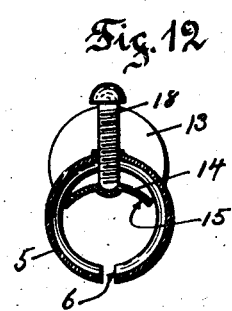
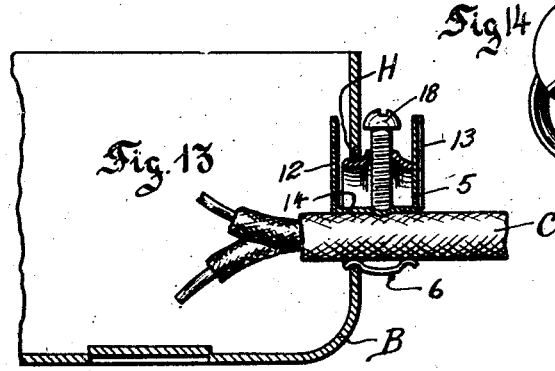
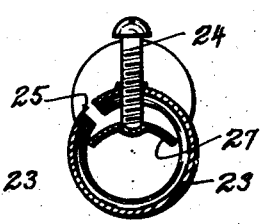
INVENTOR
Lewis H. Church
BY
Bohleber & Ledbetter
ATTORNEYS Oct. 4, 1927.
L. H. CHURCH
1,644,308
CABLE CONNECTER
Filed April 23, 1926    2 Sheets-Sheet 2
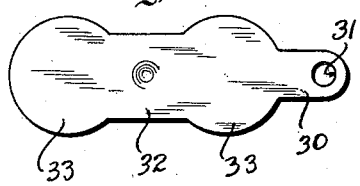
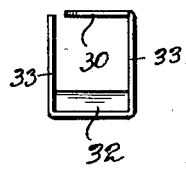
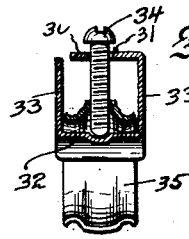
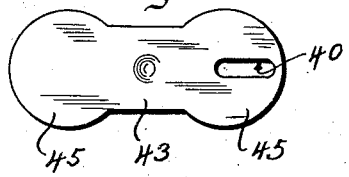
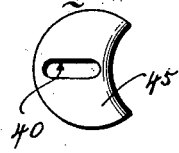
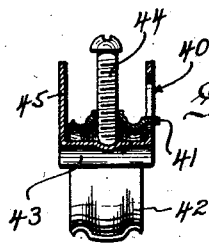
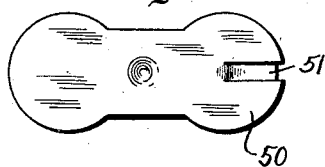
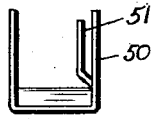
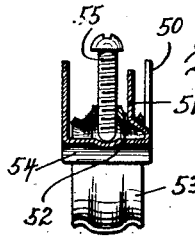
INVENTOR
Lewis H. Church
BY
Bohleber + Ledbetter
ATTORNEYS Patented Oct. 4, 1927.

1,644,308

UNITED STATES PATENT OFFICE.

LEWIS H. CHURCH, OF ELIZABETH, NEW JERSEY, ASSIGNOR TO THE THOMAS & BETTS CO., OF ELIZABETH, NEW JERSEY, A CORPORATION OF NEW JERSEY.

CABLE CONNECTER.

Application filed April 23, 1926. Serial No. 104,129.

This invention relates to cable connecters and particularly to adapter connecters capable of universally anchoring all sizes and shapes, flat or round, large or small, cable to electric fixture boxes.

A primary object of the invention is to produce an adapting cable connecter capable of anchoring various size or shape cables in box holes without having to resort to the inconvenience of changing of parts, i. e. the removal and replacement of the operating or pressure producing means such as a cable clamp screw, or the removal and replacement of an adapter element by which a connecter is changed from one cable size or shape to another cable size or shape.

A further object is to produce an adapting cable connecter so designed and constructed that when used to anchor small size flat or round cable in box holes, that means are provided to close the end of the connecter and the box hole so as to prevent the entrance of dirt, plaster or other foreign substances that is usually present near electric outlet fixture boxes in building construction, and the closing means is effective regardless of cable size or shape so long as the cable is in range of the box hole and can be inserted therein.

A still further object of the invention is to produce an improved adapter element including a bearing clamp plate which will readily combine with a cable connecter and which may be loosely mounted and retained within the connecter by means entirely independent of a screw, the said plate not being carried on or by the screw although engaged by the screw; and the adapter plate is radially or laterally and freely movable within the connecter towards the connecter and box hole axis and away from said axis in order that the adapter clamp plate cooperate with all sizes and shapes of cables.

A further object of the invention is to produce an adapting connecter possessing guide or retaining means which retaining means itself at least performs two functions, namely, that of guiding the adapter plate in its movement within the connecter, and that of sealing or covering up the connecter and box hole to prevent entrance of dirt. In addition to this a kindred object is to produce an adapter plate, the bearing and pressing portion of which may also cover over the slit or opening in expansible split-type sleeve connecters.

Likewise it is an object to provide guide means by which the adapter plate, although not necessarily held in place within the connecter by the pressure producing means or cable clamping or operating means such as a screw, is restrained from rotation about the connecter and cable axis by the guide or retaining means in question so that the cable clamp screw, though free of the adapter plate, is always in line therewith ready to apply pressure thereto.

An additional object is to produce a cable connecter having box hole anchorage means at or proximate each end thereof which is to say that as a matter of convenience both ends of my improved adapting connecter may carry an anchorage means at each end for quick and convenient attachment to and in a box hole.

Furthermore an important feature of the invention is in its ability to fit inside or outside a box and thus be quickly adapted to old or new house work without any change in parts so that it is universal in its application to boxes, it is simple to install, positive in anchoring itself and a cable to the box, and is well adapted for use with fibre armored or soft cable.

With the above and other objects in view, and having in mind the many useful functions which my adapter bearing clamp plate performs in connection with a connecter, the invention has relation to several examples of construction and modes of assembly and application, and has relation to the several changes and modifications which may be made in accordance with the principles of this invention as shown by the several exemplary views in the accompanying drawings wherein;

The first three views of the drawings disclose the structure of a split sleeve and mode of fashioning it into final form. This type of sleeve is an example of one suitable form which readily combines with my improved adapter bearing clamp plate to be described.

Figure 1 shows the flat grooved stamping before it is rolled in sleeve form; and Figure 2 shows a cross-section on the line 2—2. Figure 3 is an end elevation of the connecter sleeve rolled from the strip of Figure 1; and Figure 4 shows a sectional view taken on the line 4—4 of Figure 3.

Figures 5 to 8 inclusive show the manner of stamping and forming the new adapter bearing clamp plate; Figure 5 being the flat sheet metal blank from which the adapter plate is fashioned. Figures 6, 7 and 8 show respectively, top, end and side elevations of the finished adapter plate.

Figures 9 to 12 inclusive illustrate the assembly of the sleeve with the adapter plate; Figures 9 and 10 being respectively, end and side elevations of the complete connecter. Figures 11 and 12 are respectively, sections on the lines 11—11 and 12—12 of the former views.

Figure 13 is the assembly of the adapting connecter in a box with a cable anchored thereto by use of the adapting connecter, and the assembly shows the anchorage of small size, and what may be, flat soft cable to illustrate the utility of the invention.

Figures 14 and 15 are respectively an end elevation and a cross-section of the same connecter mentioned in the foregoing views excepting for a slightly different arrangement as to the position of the same parts.

Figures 16 to 18 inclusive show a modified form of the connecter wherein the adapter clamp plate retaining means reaches to and is carried on the screw. Figure 16 is the flat stamping from which the modified adapter clamp plate is fashioned; and Figure 17 shows the completed adapter plate. Figure 18 shows the complete connecter embodying this adapter plate.

Figures 19 to 21 inclusive show another modified form of the invention with another example of adapter plate. Figure 19 is a view of the blank from which the adapter plate is fashioned; and Figure 20 shows the finished adapter part. Figure 21 shows the complete connecter with this form of adapter.

Figures 22 to 24 show still another modified form of the invention. Figure 22 is a view of the blank from which this type of adapter plate is fashioned; and Figure 23 shows the finished adapter plate. Figure 24 shows a complete assembly of the connecter embodying this type of adapter plate.

Referring now more particularly to the drawings, first to Figures 1 to 4, for a further understanding of the invention, there is shown a flat sheet metal punching or blank fashioned into a sleeve 5 which leaves a longitudinal split 6 which renders the sleeve expansible and contractible by which it may be snapped into a box hole, as shown in Figure 13, and expanded therein to effect positive anchorage of the connecter in the box. The sleeve 5 is made with one or more box hole edge anchorage grooves 7. In this example of the invention an anchorage groove 7 is made in each parallel edge of the Figure 1 stamping with the result that when the sleeve is fashioned into the complete form Figure 4, it follows that the box hole anchorage means 7 is afforded on each end of the sleeve. In some forms of the invention, this constitutes a convenience in quickly manipulating the sleeve into the box and furthermore the double grooved end sleeve is symmetrical in form and its appearance is improved by reason of the well-balanced symmetrical ends and so the utility of the connecter is somewhat increased by its improved appearance. The sleeve necessarily carries cable clamping means and a screw is usually preferred. For this purpose a threaded screw hole 8 is made in the sleeve. This introduction as to the sleeve is exemplary of a satisfactory type of sleeve forming part of my invention.

Introduction is now made to a new adapter bearing clamp plate which possesses several functions and which is combined with any suitable form of sleeve, particularly with the sleeve hereinbefore described. The adapter bearing clamp plate is unique in that it performs numerous functions, as will be hereinafter explained.

For an example of the structure of the adapter insert plate, reference is now made to Figures 5 to 8. The first view shows the sheet metal blank from which the simple sleeve closing adapter part is made. The blank comprises a bearing body 14 with spreading cover or shutter plate 12 and 13 on each end thereof. The adapter insert made from the blank constitutes a U-shaped part having parallel upstanding shutter plates or legs 12 and 13 turned up and integrally formed on and at right angles to the cable bearing body or base plate portion 14. The bearing portion 14 is curved or arched, if desired, as indicated by 15 to in part conform to the cylindrical sleeve. The shutter closure ends 12 and 13 may be made circular, as indicated by the number 16 and are substantially equal in size to the diameter of the sleeve 5. One or both parallel end parts 12 and 13 are made substantially broad to spread across the sleeve end or ends although the closure of the sleeve 5 may be well established by employing one spreading plate 12 or 13 if that be a convenient form in the manufacture of the connecter.

The assembly of the sleeve and the adapter insert to make a finished connecter is illustrated in Figures 9 to 12. It is observed that the U-shaped adapter insert is mounted in the sleeve with the cable bearing portion 14 parallel to the sleeve axis and with the parallel closure plates 12 and 13 slidably engaging each end of the sleeve. In this way, the adapter plate 14 is free to slide up and down in the sleeve and the end plates 12 and 13 guide it in lateral motion. No matter what lateral position the bearing plate 14 assumes, it follows that the circular parallel end plates 12 and 13 always close the sleeve end. In effect the round plates act like double sliding doors and always maintain closed that portion of the sleeve passage or box hole passage not occupied by the cable.

It is significant that the cable clamp screw 18 mounted in the threaded aperture 8 is not necessarily connected with the adapter bearing clamp plate although in line therewith and although acting against the plate to bring it down against the cable C received into the box hole H within the electric fixture box B. Since the screw does not have to be connected with, that is it does not pass through the adapter plate, it follows that the adapter insert is free to move laterally within the sleeve without necessarily turning the screw. The screw and adapter insert are independently mounted on and in the connecter sleeve.

The adapter insert while free to adjust or move itself laterally in the sleeve, is restrained against rotary motion therein and means to accomplish this purpose may take any suitable form. As for example, both plates 12 and 13, or one of the end plates, may have a rib 20 pressed inwardly and running parallel to the line of lateral movement of the adapter insert within the sleeve. This rib 20 registers with and slides within a notch 21 formed in one or both ends of the sleeve 5. The cooperating rib and notch means 20—21 locks the sleeve and adapter insert together and prevents relative rotation but permits relative lateral motion between the two parts so that the bearing plate 14 is confined in alignment with the screw 18.

The foregoing description covers one satisfactory form of construction made in accordance with the principles of this invention and its manner of use is portrayed in Figure 13. The sleeve 5 is snapped in the box hole H. It is a noteworthy feature that either end of the sleeve may be placed in registry with the box hole edge H and furthermore the connecter may be inserted from the inside or outside of the box depending upon the character of work at hand. The cable C is placed in the connecter and the screw 18 is run down against the bearing plate 14 with the result that the cable C is pressed along the entire length of the plate 14 against the wall of the sleeve connecter and simultaneously the sleeve expands to anchor this groove 7 in the box hole edge H. It results that one or both ends of the sleeve 5 are closed by the end door or cover plates 12 and 13 which installation provides a unique and well closed fixture box and cable installation.

The connecter member 5, of whatever suitable form it assumes under the principle of the invention, reacts or expands under the power of the pressure producing means or screw 18 to render operative and effective the connecter anchorage means 7 to anchor the connecter in a box hole by reason of expanding or positively seating the groove 7 against the box hole edge.

The spread of the cover plates at each end of the sleeve, i. e. their diameter may be sufficient to stop against the sleeve ends. In other words, the circular end plates are slightly larger than the sleeve ends so that the sleeve is confined on the insert. One cannot come loose from the other, although they are freely movable on each other.

Referring now to Figures 14 and 15, the structure there shown is the same as described above except for a slightly different placement of parts. In this form of the invention, the sleeve 23 carries the cable clamp screw 24 mounted substantially close to the sleeve slit 25 and the bearing portion 27, i. e. the base 27 of the U-shaped adapter insert, overlaps the slit 25 which in effect further seals the sleeve. The cable C rests in the solid wall portion of the sleeve 23 in this form of the invention which makes a very good assembly. The expansion of the sleeve 23 in a box hole may be facilitated somewhat in placing the screw toward or adjacent the slit 25.

As hereinbefore suggested, this adapter insert is unique in that it performs numerous functions. It adapts or converts the sleeve connecter to any size or shape cable; it closes both ends of the sleeve and therefore closes the box hole into which the sleeve and cable are inserted; it covers over the screw end and receives the pressure of the screw to prevent damage to the cable; it distributes the pressure of the screw over a considerable area of the cable thereby protecting the cable; it provides sleeve closing means by which said sleeve is always closed regardless of the shape or size of cable placed within the sleeve; it enables the manufacturer to utilize old large-size split sleeve connecters with small-size cable now coming into use; and in fact this adapter insert reduces the cost of manufacture of connecters and very largely facilitates the installation of cable within electric fixture boxes.

Coming now to Figures 16 to 18 inclusive for a description of a modified form of the invention, there is shown a cable adapter connecter altered in structure, under the principles of this invention, as respects the adapter insert. A tongue 30 provided with a large loose fitting screw hole 31 is stamped integral with the adapter blank 32 carrying the cover plates 33. The blank of Figure 16 is fashioned into that form shown in Figure 17 so that the tongue 30 lies parallel to the cable bearing base plate 32 and a cable clamp screw 34 passes freely through the hole 31 and is screw threaded into a sleeve 35. In this way, the tongue 30 cooperates with the screw 34 to prevent rotation of the cable clamp plate in the sleeve.

Another modified form of the invention shown in Figures 19 to 21 inclusive wherein a slot 40 in the adapter insert is slidably confined on an ear or tongue 41 projecting integrally from the end of the sleeve connecter 42. In this way the cable bearing portion 43 of the adapter insert is retained in alignment with the cable clamp screw 44 so that the means to restrain relative rotation of parts constitutes a simple structure which cooperates between one or both cover plates 45 and the end or ends of the sleeve 42.

Still another example or modification of the invention is shown in Figures 22 to 24 inclusive wherein the cover plate 50 carries a punched in tongue 51 which slides up and down in an aperture 52 formed in the sleeve 53. The cooperation between the tongue or guide part 51 and hole 52 in the sleeve retains the bearing clamp plate portion 54 in alignment with the cable clamp screw 55.

From a consideration of the several foregoing forms of the invention, it is obvious that the adapter clamp and cover plate serves the useful purposes of delivering pressure to the cable and closing or shutting off the sleeve ends as well as increasing or reducing the internal diametrical size of the sleeve to adapt it to any size and shape of cable for it is to be noted that the horizontal bearing or base plate part of the adapter is slightly arched so that it may readily conform to round cable or oval cable.

It is unique in a cable connecter to attribute the numerous functions to a single operating means, the screw, as here. The one screw functions to seat the connecter box anchorage means 7 against the edge of the box hole by expanding the connecter sleeve when made in that form; the screw holds the shutter plate or plates closed, and actuates the clamp plate to secure a cable in the connecter and box hole.

The clamp plate 14 being arched cooperates with the opposite portion of the connecter sleeve to form a reduced size sleeve passage which is substantially oblong in cross section. Flat or oblong shape in cross-section cable is therefore provided for, i. e. this connecter changes its passage shape from round to substantially oblong by moving the arched clamp plate toward or past the center of the sleeve.

What I claim is:

1. A cable connecter combining therewith adapter means by which various sizes and shapes of cable may be secured in a box hole without change or removal of any parts comprising, a member including box hole anchorage means, pressure producing means mounted thereon, an adapter clamp plate carried by the member and acted on by said pressure producing means and laterally movable in relation to the member to clamp against a cable, and retaining means included on both ends of the adapter clamp plate and slidably engaging the member and of sufficient size for preventing the bodily separation of the parts.

2. A connecter as defined in claim 1 wherein the retaining means includes an upturned end on the adapter plate, which up-turned end is large enough to cover the connecter end and close a box hole.

3. A connecter as defined in claim 1 wherein the retaining means is formed by both ends of the adapter plate being bent at right angles to the plate and slidably engaging the connecter to hold the parts together, and said right angle ends being broad in area to close the connecter when the adapter plate is placed toward the center of the connecter to clamp against small cable.

4. A cable connecter combining therewith adapter means by which it will secure various sizes of cable in a box hole, a connecter and a screw mounted thereon and including box hole anchorage means, an adapter clamp plate mounted in the connecter and slidable toward a cable received into the connecter to bear against small size cable or large size cable, said adapter clamp plate being forced against any size cable received into the connecter by running the screw down into contact with said plate, and retaining means cooperating with both ends of the connecter and with both ends of the clamp plate of sufficient size to hold the two parts together and permit free relative motion between the parts.

5. A connecter as defined in claim 4 wherein a box hole anchorage means is provided on each end of the connecter.

6. A connecter as defined in claim 4 wherein said retaining means on at least one end of the connecter is a broad closure plate substantially as large as the diameter of a box hole into which the connecter fits to cover up the connecter end when the adapter clamp plate bears on small size cable.

7. A connecter as defined in claim 4 wherein said retaining means on both ends of the connecter is made in the form of broad circular plates substantially equal in size to the connecter and to a box hole to close both connecter ends.

8. A cable connecter combining therewith adapter means by which it will secure large or small cable in a box hole, a sleeve with a screw mounted thereon and also including box hole anchorage means, an adapter clamp plate mounted in the sleeve and slidable laterally in the sleeve to bear on large or small cable, said plate being forced against any size cable received into the sleeve by running the screw down into contact with said plate, and means of sufficient size cooperating with the ends of the sleeve and the ends of the clamp plate to hold the two parts together.

9. A connecter as defined in claim 8 wherein said box hole anchorage means is formed on each end of the sleeve.

10. A connecter as defined in claim 8 wherein the said last named cooperating means constitutes two parallel spreading plates formed by turning up the ends of the adapter clamp plate, and said plates being of sufficient size to overlap and cover the sleeve ends to hold the parts together.

11. A connecter combining therewith adapter means by which it will secure large or small size cable in a box hole, a sleeve with a screw mounted thereon and including box hole anchorage means, an adapter clamp plate mounted in the sleeve and acted on by the screw and free to move laterally therein, means included on the plate independent of the screw to retain the clamp plate in the sleeve in a freely movable relation thereto, and said last named means also including a shutter movable with the clamp plate to close the sleeve.

12. A connecter as defined in claim 11 wherein means are provided to prevent rotation of the plate in the sleeve to thereby hold it in line with the screw.

13. A combination cable connecter and adapter comprising, a connecter including box hole anchorage means and including a screw mounted thereon, a plate substantially the length of the connecter and freely movable laterally therein, and retaining and box hole cover means carried on the ends of the plate to close the ends of the connecter and hold it and the plate together in all lateral positions of the plate in the connecter.

14. A combination cable connecter and adapter as defined in claim 13 wherein the said plate and retaining means are made from a single sheet metal stamping fashioned into U-shaped form which includes parallel legs which stand at right angles to the sleeve axis, and which slide up and down in relation to the connecter ends.

15. A connecter as defined in claim 13 but characterized by the fact that the connecter is made in sleeve form, and means which prevents rotation of the plate in the sleeve yet allows free lateral motion therebetween.

16. A connecter as defined in claim 13 but characterized by engaging means which cooperates with the end of the connecter and with one end of the retaining and box hole cover means to prevent rotation of the plate in the connecter yet allow free lateral relative motion between the two parts.

17. A cable connecter comprising, a sleeve split longitudinally including expansible anchorage means by which it grips a box hole edge, a combination bearing and adapter clamp plate mounted in the sleeve and including an upturned end bent at right angles to the sleeve axis and which projects outside the end of the sleeve and is free to move laterally in relation to the sleeve, enlarged means on the other end of the plate cooperating with the upturned end to hold the plate in the sleeve said upturned end and enlarged means being of sufficient size to retain the parts in working relation, and clamping means carried by the sleeve bearing on the plate and simultaneously expanding the split sleeve to work the expansible anchorage means.

18. A cable connecter combining therewith adapter means to secure large or small cable in a box hole, a connecter member embodying box hole edge anchorage means, screw clamping means mounted on the connecter member to render effective the anchorage means and clamp a cable in the connecter, an adapter part mounted in the connecter and means rendering it freely movable laterally therein independently of the clamping means but cooperating with said clamping means to bear on a cable received into the connecter member, said clamping means cooperating with the adapter part to force said part against a cable of any size received into the connecter member, and cover means carried by the adapter part which closes a box hole and connecter member for all positions of the adapter part in relation to the connecter member.

19. A cable connecter comprising, a split sleeve, with a screw mounted thereon to expand it, and box hole anchorage means rendered effective by said expansion, a U-shaped adapter bearing clamp plate mounted in the split sleeve with enlarged parallel legs thereof slidable in relation to the sleeve ends and with the body of the plate mounted in line with the screw.

20. A cable connecter as defined in claim 19 wherein a cooperating rib and groove guide means is formed in the end of the sleeve and in one of the parallel legs to prevent relative rotation between the plate and sleeve.

21. A cable connecter as defined in claim 19 wherein a groove is made in one end of the sleeve, and a rib pressed into one of the parallel legs which slides in the groove.

22. A cable connecter comprising, a U-shaped adapter insert including spaced enlarged parallel parts integral on a cable bearing portion, a sleeve mounted on the cable bearing portion of the adapter insert with the sleeve ends slidably resting against and closed by the spaced parallel parts, and a screw mounted in the sleeve to deliver pressure to the cable bearing portion of the adapter insert.

23. A cable connecter comprising, an adapter insert which is substantially U-shaped in side elevation, a split sleeve movably confined on the adapter insert so that the ends of the sleeve rest close to and are closed by enlarged parallel parts of the U-shaped insert, and a screw mounted on the sleeve between the parallel parts of the insert.

24. A connecter as defined in claim 23 but distinguished by making the parallel parts circular in form and about equal in diameter to the sleeve.

25. A connecter as defined in claim 23 but distinguished by making the parallel parts circular in form and about equal in diameter to that of the sleeve, and a groove and rib retaining means cooperating with the sleeve end and circular plate to prevent rotation of the adapter insert in the sleeve.

26. A cable connecter comprising, a substantially U-shaped adapter insert including a base with parallel spaced plates, said plates being circular in form, a split cylindrical sleeve mounted for free lateral movement on the base between the circular plates and being smaller in diameter than said circular plates, said sleeve having a box hole anchorage means, and a screw mounted on the sleeve midway thereof between the parallel circular plates.

27. A connecter as defined in claim 26 wherein a notch is formed in the sleeve end, and a rib formed in a circular plate slidably engaging the notch and thereby preventing rotation of the sleeve on the adapter insert.

28. A connecter as defined in claim 26 wherein a notch is formed in the sleeve end, a rib formed in a circular plate slidably engaging the notch and thereby preventing rotation of the sleeve on the adapter insert, and a box hole anchorage means made on the other end of the sleeve.

29. A cable connecter comprising, a sleeve slit longitudinally and including box hole anchorage means, a screw mounted on the sleeve adjacent the slit, a substantially U-shaped adapter insert having a base and having up-turned parallel end plates, said insert mounted in the sleeve with the base parallel to the sleeve axis, said base covering over the sleeve slit, and an end plate substantially closing each sleeve end.

30. A connecter comprising, a member including box hole edge anchorage means on each end thereof by which either end of the member may be anchored in a box hole, and means carried by the member to grip against a cable and render effective said box hole edge anchorage means.

31. A connecter comprising, a member including box hole edge anchorage means proximate each end thereof by which either end of the member may be anchored in a box hole, and operating means mounted on the connecter between said anchorage means to grip a cable and react to simultaneously seat either of said anchorage means in a box hole.

32. A connecter comprising, a longitudinally split sleeve-like member including box hole edge anchorage means proximate each end thereof, and cable clamping means mounted in the sleeve-like member to grip a cable and to expand the anchorage means in a box hole.

33. A connecter comprising, a longitudinally split sleeve including box hole edge anchorage means on each end thereof, and a screw threaded through the sleeve to grip against a cable received therein and react to expand the box hole anchorage means at either end of the sleeve.

34. A connecter comprising, a sleeve with a peripheral box hole edge anchorage groove formed in each end thereof and a longitudinal split extending through the sleeve and through both grooves, and a screw threaded through the sleeve between the end grooves to grip against a cable and react to expand the grooves into anchoring engagement with a box hole edge.

35. Cable and box connecting means comprising, a box having a cable and connecter receiving hole, a connecter of suitable size to fit into the box hole including means to anchor it therein, cable clamping means on the connecter moving toward and against a cable to grip it, and a shutter cover plate slidably mounted on the connecter parallel to the wall of the box and cooperating with the clamping means and movable across the box hole to close it by the aforesaid movement of the cable clamping means.

36. Cable and box connecting means comprising, a box having a cable and connecter receiving hole, a connecter including box hole edge engaging means disposed in the box hole, a cable clamping screw threaded through the connecter screwing toward the cable to grip it and react to seat the engaging means against the box hole, and a movable box hole cover plate including means to retain it on the connecter and disposed adjacent and parallel the box wall and including means operable by the screw to slide the cover plate over the box hole to close it as the screw travels toward the cable.

37. A cable connecter combining therewith adapter means by which various sizes and shapes of cable may be secured in a box hole without change or removal of any parts comprising, a connecter member, pressure producing means mounted thereon, said connecter member including box hole anchorage means operated by said pressure producing means to fix the member in a box hole, an adapter clamp plate carried by the member and acted on by said pressure producing means and laterally movable in relation to the member to clamp against a cable, and said connecter also including enlarged interengaging means on said member and adapter clamp plate for guiding the latter in its movement with respect to said member and for normally preventing the bodily separation of said parts and for closing a box hole.

38. A cable connecter combining therewith adapter means by which various sizes or shapes of cable may be secured in a box hole without change or removal of any parts comprising, a connecter member including box hole anchorage means, pressure producing means mounted on said member, an adapter clamp plate carried by the member and acted on by said pressure producing means and laterally movable in relation to the member to clamp against a cable, and a shutter movably carried with the connecter member and operated by the pressure producing means to close a box hole.

39. A cable connecter combining therewith adapter means by which various sizes and shapes of cable may be secured in a box hole without change or removal of any parts comprising, a sleeve including box hole anchorage means, pressure producing means mounted on said member, an adapter clamp plate carried by the connecter and acted on by said pressure producing means and laterally movable in relation to the connecter to clamp against a cable, and a shutter movably mounted transversely of the sleeve axis and also acted on by the pressure producing means to close the sleeve.

40. A connecter including adapter means to secure cable in a box hole comprising, a sleeve including box hole anchorage means, a screw mounted in the sleeve, a clamp plate carried in the sleeve parallel to the sleeve axis in line with the screw and free to move laterally in respect to said sleeve, and means to hold the sleeve and clamp plate together including a shutter means to close the sleeve.

41. A cable connecter comprising a member including means to anchor it in a box hole, a screw threaded thru the member to deliver pressure against a cable placed in the box hole, and a shutter means movably carried on the connecter member and operated by the screw to close the box hole.

42. A cable connecter comprising a sleeve including means to anchor it in a box hole, a pressure producing means mounted on the sleeve to fasten a cable therein, and a shutter movably mounted transversely of the sleeve axis and operated by the pressure producing means to close the sleeve.

43. A connecter comprising, a sleeve including box hole anchorage means; an adapter cooperating with the sleeve and including, a clamp plate movable laterally within the sleeve, said clamp plate being arched to substantially conform to the sleeve and convert a round sleeve passage into substantially oblong shape in cross section by adjustment of the clamp plate within the sleeve, and a shutter carried with the clamp plate to close off that portion of the sleeve passage not occupied by a cable; and operating means carried with the sleeve to apply pressure on the clamp plate.

In testimony whereof I affix my signature.

LEWIS H. CHURCH.